United States Patent
Logan et al.

(10) Patent No.: US 9,926,128 B1
(45) Date of Patent: Mar. 27, 2018

(54) MULTI-ROLL PET WASTE BAG ORGANIZER AND DISPENSER

(71) Applicant: MERRIVIEW HILL LLC, New York, NY (US)

(72) Inventors: Edward Francis Logan, New York, NY (US); George Wargo, Norwalk, CT (US); Robert John Tiedemann, Stamford, CT (US)

( * ) Notice: Subject to any disclaimer, the term of this patent is extended or adjusted under 35 U.S.C. 154(b) by 0 days.

(21) Appl. No.: 15/818,928

(22) Filed: Nov. 21, 2017

Related U.S. Application Data

(60) Provisional application No. 62/425,290, filed on Nov. 22, 2016.

(51) Int. Cl.
| | | |
|---|---|---|
| A01K 23/00 | (2006.01) | |
| B65D 83/08 | (2006.01) | |
| B65H 16/00 | (2006.01) | |
| B65H 16/02 | (2006.01) | |

(52) U.S. Cl.
CPC ..... B65D 83/0805 (2013.01); B65D 83/0894 (2013.01); B65H 16/005 (2013.01); B65H 16/021 (2013.01); A01K 23/005 (2013.01); B65H 2701/175 (2013.01)

(58) Field of Classification Search
CPC ......... B29C 66/71; A61B 42/40; A61B 42/50; B65D 83/0805; A41D 19/0072; A47G 25/904
USPC ........... 221/46, 197, 49, 63, 283, 45, 48, 56; 493/180; 206/390; 383/8
See application file for complete search history.

(56) References Cited

U.S. PATENT DOCUMENTS

| | | | | |
|---|---|---|---|---|
| 617,284 | A * | 1/1899 | Darnes | A47F 1/085 193/27 |
| 1,546,807 | A * | 7/1925 | Straubel | A47K 10/424 221/48 |
| 1,587,463 | A * | 6/1926 | Arms | A47K 10/425 221/52 |
| 2,871,078 | A * | 1/1959 | Carleo | A47K 10/3827 242/560.3 |
| 4,181,218 | A * | 1/1980 | Cox | A47K 10/3827 206/205 |
| 4,294,389 | A * | 10/1981 | Falk | A47K 10/3827 225/34 |
| 4,491,242 | A * | 1/1985 | Trinidad | A47K 10/426 211/50 |
| 5,765,718 | A * | 6/1998 | Grasso | A47K 10/3818 221/1 |

(Continued)

*Primary Examiner* — Timothy R Waggoner
*Assistant Examiner* — Ayodeji T Ojofeitimi
(74) *Attorney, Agent, or Firm* — Keala Chan; Chan Hubbard PLLC

(57) ABSTRACT

A wall-mounted, vertical holder, organizer and dispenser for pet waste bag rolls. Pet waste bag rolls come in standardized sizes wound about a spool, each bag separated from the next by a serrated transversal line. These rolls can be fed horizontally from the top of the dispenser to remain held and organized in the dispenser in a stacked configuration. The dispenser facilitates a bag being separated from the bottom-most roll, pulled through a wedge and chute located near the base on the front of the dispenser, and torn off for use without dislodging the bags from the dispenser or the dispenser from the wall. The wedge holds the next bag in the chute, ready for next use.

17 Claims, 7 Drawing Sheets

(56) References Cited

U.S. PATENT DOCUMENTS

| | | | | |
|---|---|---|---|---|
| 6,168,019 B1* | 1/2001 | Olson | ............... | A41D 19/0075 206/278 |
| 6,328,252 B1* | 12/2001 | Neveu | ............... | A47K 10/3818 221/1 |
| 6,334,544 B1* | 1/2002 | Christensen | ......... | A47K 10/424 221/303 |
| 8,960,497 B2* | 2/2015 | Lefeber | .................. | F42B 39/26 193/27 |
| 2002/0160896 A1* | 10/2002 | Yeh | ..................... | B65D 33/002 493/180 |
| 2005/0199690 A1* | 9/2005 | Peterson | ............. | B65D 5/0254 229/122.1 |
| 2009/0223992 A1* | 9/2009 | Lorenzati | ............. | A47K 10/421 221/34 |
| 2011/0272429 A1* | 11/2011 | Harfert | ................ | A61F 15/001 221/130 |
| 2012/0032565 A1* | 2/2012 | Stoop | ................ | A47K 10/3818 312/34.4 |
| 2015/0327734 A1* | 11/2015 | Denis | .................. | A47K 10/424 221/33 |

* cited by examiner

MULTI-ROLL PET WASTE BAG ORGANIZER AND DISPENSER

CROSS REFERENCE TO RELATED APPLICATIONS

This application claims priority to U.S. Provisional Appl. No. 62/425,290 filed on Nov. 22, 2016.

FIELD OF THE INVENTION

The invention lies in the field of bag dispensers and, more particularly, wall-mounted dispensers for rolls of plastic bags separated by perforation.

BACKGROUND OF THE INVENTION

For most pet owners, especially dog owners, pet waste bags are an essential item. Pet waste bags (also known as doggie poop/waste disposal bags) are usually sold in standardized rolls of eight to fifteen bags, yet there is nothing available to consumers that organizes and dispenses such rolls. As a result, pet owners lose bags, waste bags, forget to bring bags to the dog park the rolls of poop bags are often left unused. As a result, pet owners attempt makeshift means of organization such as storing rolls of pet waste bags in bowls, on shelves, in shoe boxes, etc. Rolls of pet waste bags are often strewn about closet shelves, floors, drawers, pockets, and the like. Furthermore, such makeshift means provide no easy way to let pet owners know that they are running low on this essential item.

Furthermore, many pet owners also deem their pets as members of the family and seek to include their pets' needs when they design and decorate their home. While some consumers use pet waste bag dispensers that can be attached to a leash, a stationary or wall mounted device for organizing and storing the roll of bags in the home does not exist in the market. Yet there is a strong need for such multi-roll organizer and dispenser of pet waste bags, providing a simple, accessible, convenient, single location to store, organize and dispense one pet waste bag at a time.

SUMMARY

The object of the present invention is to provide a wall-mounted, multi-roll organizer and dispenser device for pet waste bags. A second objective for this invention is to offer an aesthetically and structurally balanced device, so as to retain a low profile yet sufficient functionality to organize multiple rolls, permit easy insertion by "gravity feeding," show the current status/number of rolls in the organizer, and release bags one and a time for use as needed. A third objective is for present invention to be compatible with many types of standardized rolls of pet waste bags, and to be adaptable to indoor and outdoor locations.

The bag dispenser is designed for any standardized roll of rectangular shaped pet waste bags in such a manner that the waste bags rolls can easily be dispensed continuously, each waste bag roll providing a plurality of pet waste bags detachably connected end to end in roll manner along pre-cut connection lines or perforations. The device is generally comprised of a vertical rectangular receptacle that can hold several cylindrical waste bag rolls lengthwise in a stacked configuration. The vertical receptacle is gravity fed, allowing a waste bag roll to be dropped in from the top of the receptacle and fall to the bottom. From the bottom of the receptacle, the first bag at the end of the roll can be fed through a stabilizing dispenser and torn off as needed. The device is wall-mountable, and the stabilized dispenser serves to center the bag within the receptacle and create sufficient resistance to allow a single bag to be torn free without jostling or prying the device from the wall, and to present a next bag in the dispenser ready to be torn off for subsequent use.

DETAILED DESCRIPTION

Figure 1:
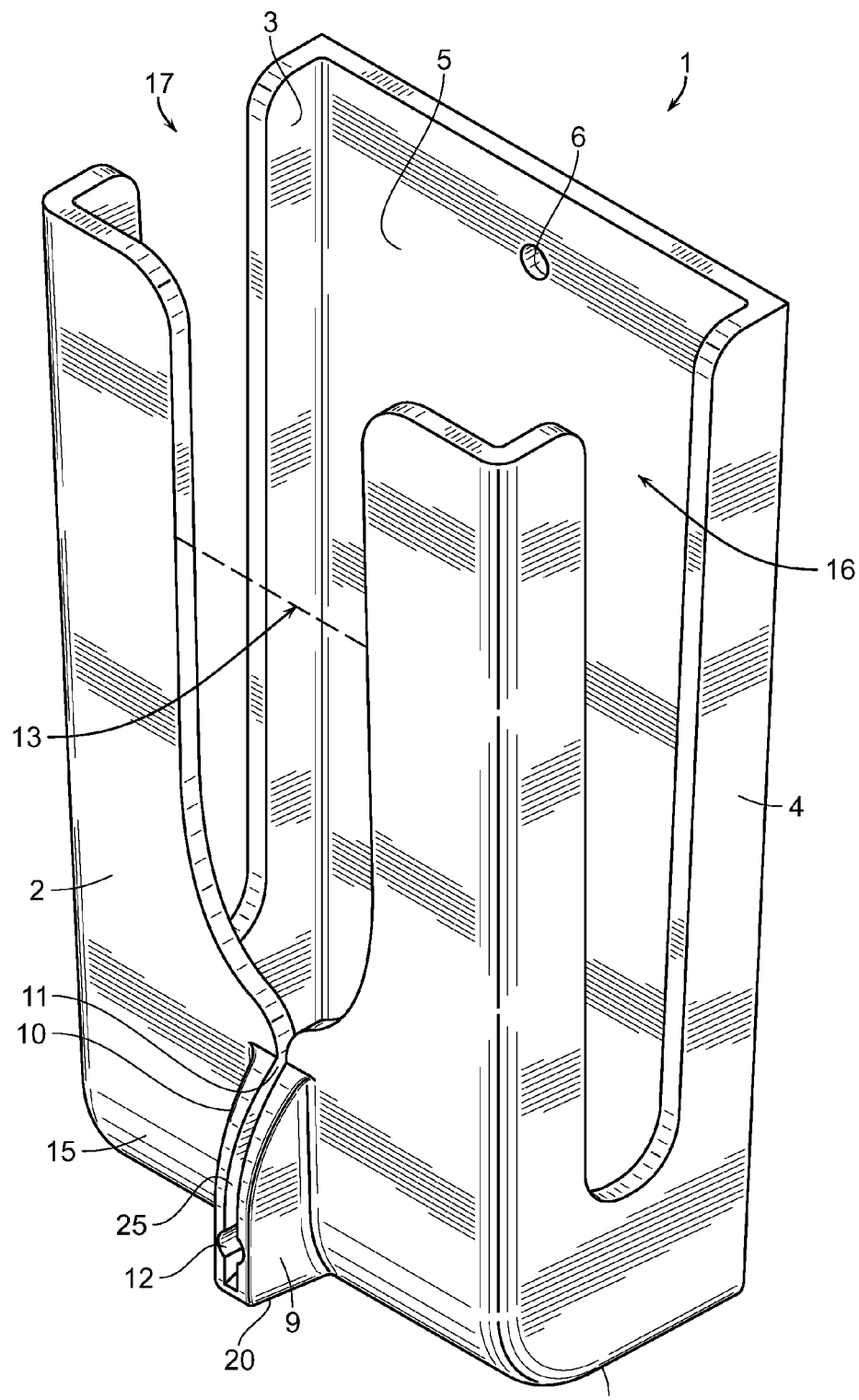
FIG. 1 is a right side perspective view of the device.
Figure 2:
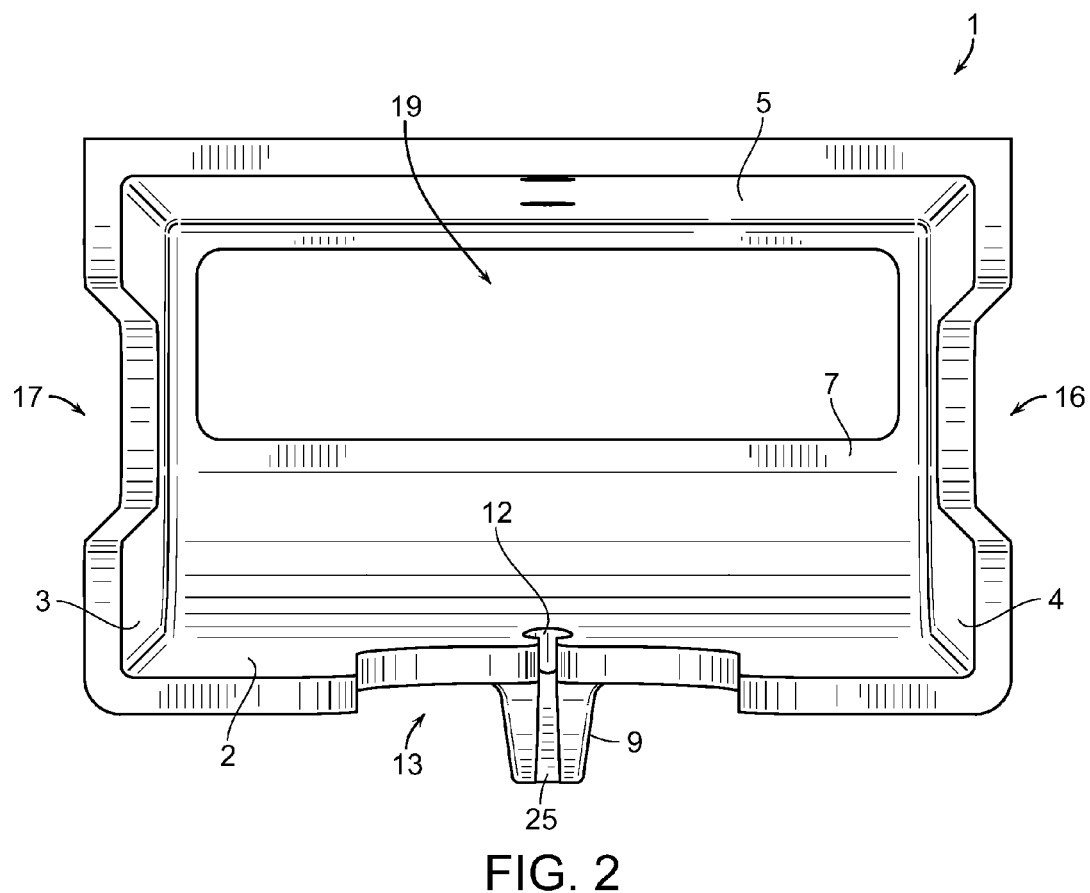
FIG. 2 is a top elevational view of the device.
Figure 3:
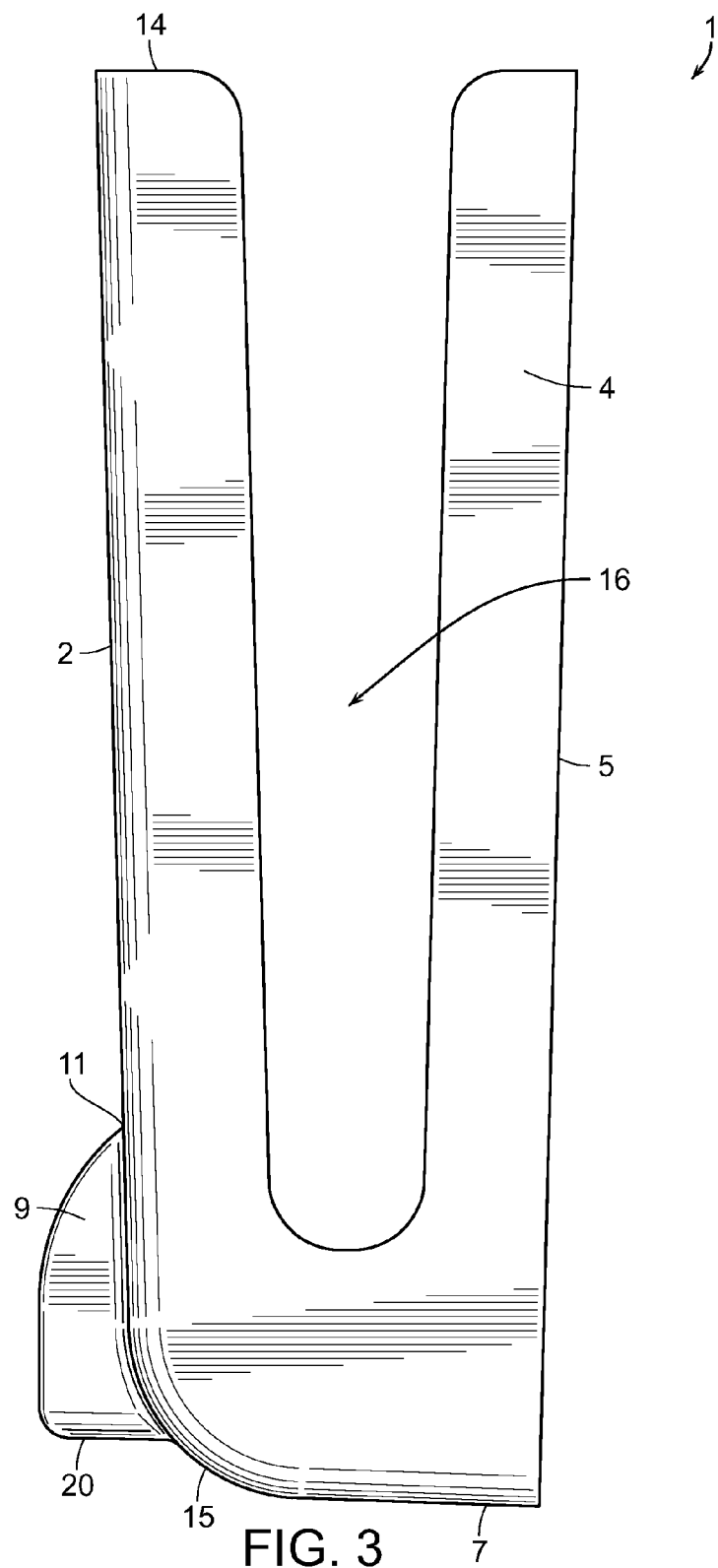
FIG. 3 is a side elevational view of the device.
Figure 4:
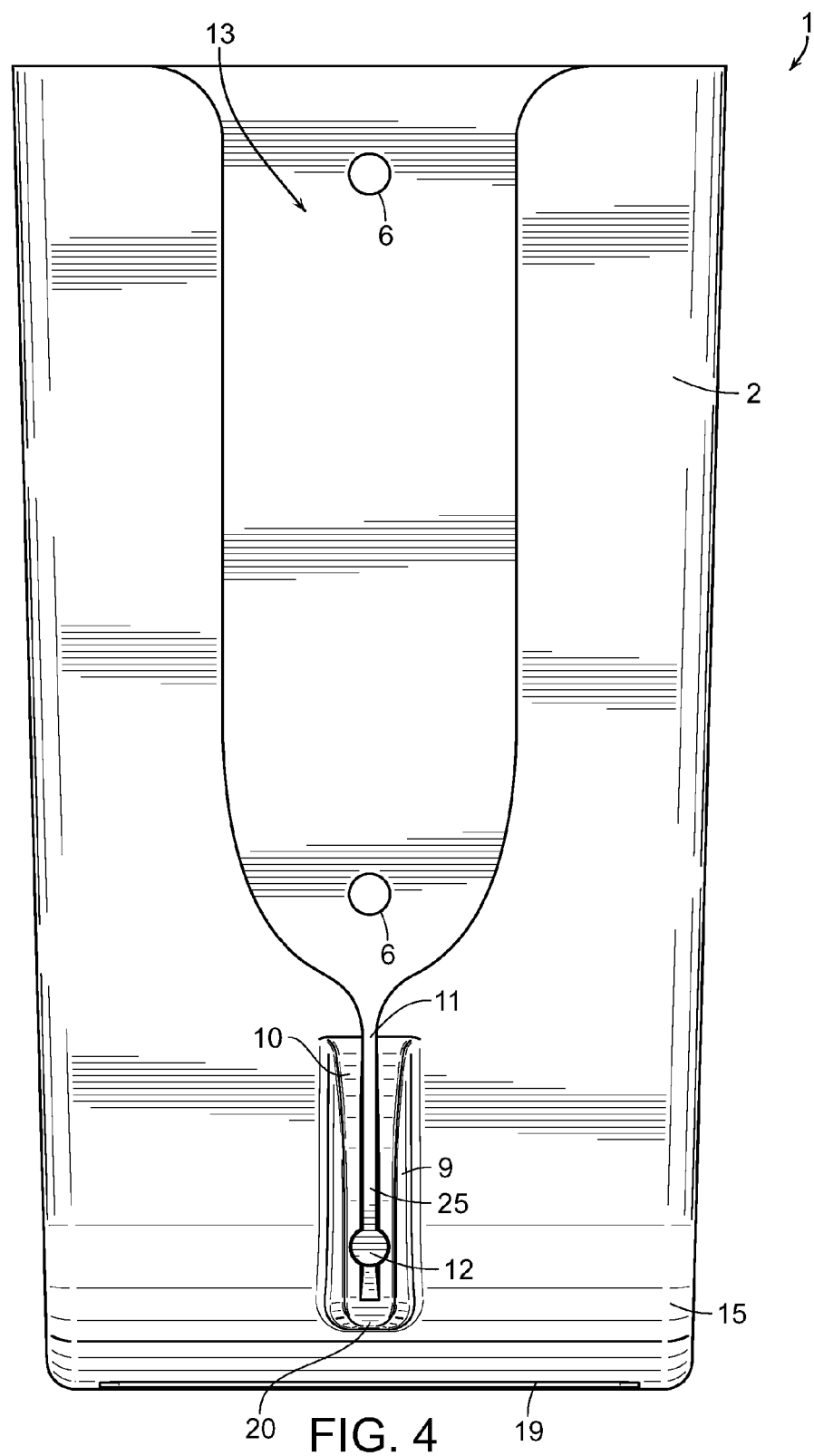
FIG. 4 is a front elevational view of the device.
Figure 5A:
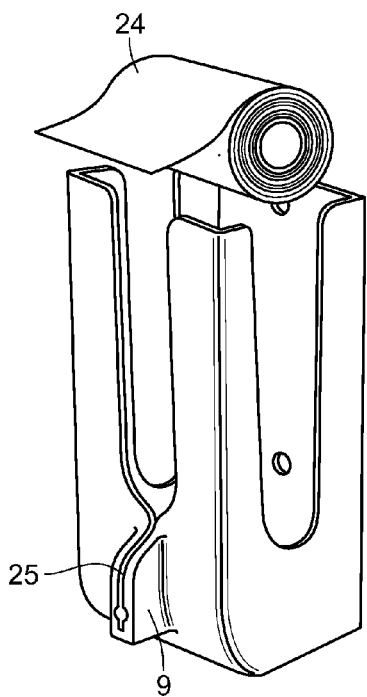
FIG. 5A is a right side perspective of the device during use, namely a roll of bags is being placed in the device.

Referring now to FIGS. 1-4 there is shown a device that organizes and dispenses individual pet waste bags from standardized rolls. The pet waste bags are typically manufactured in rolls wound about a spool, with serrated transversal lines for detachment from the adjoining bag. The device comprises a rectangular receptacle [1] with a front sidewall [2]; opposing left and right sidewalls [3 and 4] defining the width of the rectangular receptacle, the width being sufficient to accept the roll placed horizontally in the receptacle; a rear sidewall [5]; a bottom sidewall [7]; and no top sidewall, such that rolls of bags can be deposited horizontally into the receptacle as shown in FIG. 5A.

On the front sidewall just above the bottom is a dispensing wedge [9], which serves as a dispenser of individual bags, holding each bag in the wedge as it is drawn through the wedge, and trapping a next bag in the wedge when the first bag is torn off along the perforated separation. In order to accomplish this, the wedge [9] is typically a solid three-dimensional wedge also comprising a vertical dispensing chute [25] of lesser width than the width of the wedge, the dispensing chute [25] being in open communication with the interior of the receptacle [1], thus enabling a bag to be pulled out from the interior of the receptacle through the chute. The wedge itself [9] is comprised of a base [20] protruding perpendicularly from the front sidewall [2] of the receptacle [1]; a tip [11] meeting the front sidewall [2]; and a curved wedge front defined by a curved hypotenuse [10] between the base [20] and tip [11] of the wedge [9], such that the depth of the wedge [9] near the base [20] is greater than the depth of the wedge near the tip [20]. The width of the wedge [9] is narrowest near the base of the wedge and slightly wider near the tip [11]. The shape of the wedge [9] means that as a result of a bag is drawn downward into and through the chute [25], the chute grips the bag, providing sufficient resistance for the user to tear the bag off of the roll at the perforation point.

Furthermore, the structure of the wedge [9] permits the next bag to remain trapped in the chute after the outermost bag has been torn off from the roll [25], so that this subsequent bag can be readily accessed and torn free when needed. In the preferred embodiment, the dispensing chute [25] contains a dispensing aperture [12] comprised of a cylinder with width larger than that of the dispensing chute [25]. Said wider dispensing aperture [12] serves as a pressure release point for the bag trapped in the chute, which is critical to ensure that the roll of bags remains in a resting position at the base of the receptacle [1]. In the absence of the dispensing aperture [12], pressure on the bag currently trapped in the chute can cause the roll of bags to shift or slide up in the receptacle. The dispensing aperture prevents this upward slide and also facilitates the extraction and tearing of a bag from the roll.

Figure 5B:
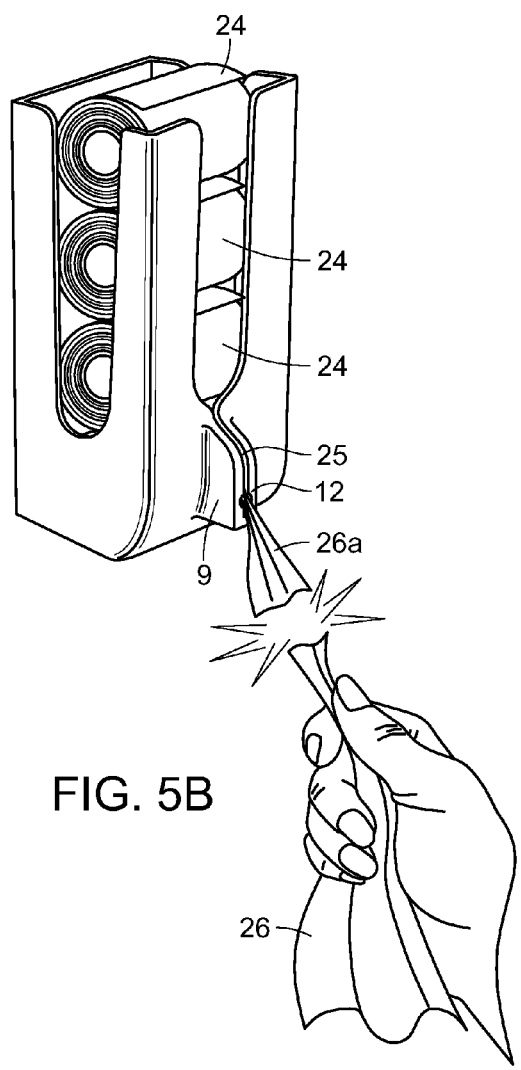
FIG. 5B is a left side perspective of the device during use, namely the device retaining multiple rolls of bags with one bag being extracted from the bottom roll.

Furthermore, the dispensing chute [25], which stretches from the tip [11] to at or near the base [20], is in open communication with the front opening [13] in the front sidewall [2]. This front opening [13] is sufficiently wide to allow user access to the roll of bags in order to extract an outer bag, and pull it down and out through dispensing chute [25], as shown in FIG. 5B. Moreover, the front opening [13] narrows to meet the dispensing chute [25] tip [11] of the wedge, guiding the bag into the chute and gradually increasing the resistance force on the bag. With reference to FIG. 5A, when first dropping a bag roll [24] into the receptacle [1], the design facilitates the first bag being drawn down through dispensing slot [25] to permit easy extraction of the first bag at any time. The front opening [13] also allows the number of remaining rolls of bags to be seen through the front sidewall.

Therefore, with reference to FIGS. 5A-5B, the guide wedge [9] facilitates easy removal of a bag by tearing at perforated edges that separate one bag from the next. The guide wedge [9] protrudes from the front of the receptacle, allowing the user to tear the extended bag from any angle, and it provides sufficient counterforce so that little force is required to tear the extended bag. Moreover, the guide wedge [9] provides sufficient stabilization to retain the next bag slightly emerged from the dispensing slot [25]. The guide wedge [9] also provides sufficient stabilization so that the tearing force does not jostle, dislodge or pry the device from its mounting position on a wall.

Figure 7:
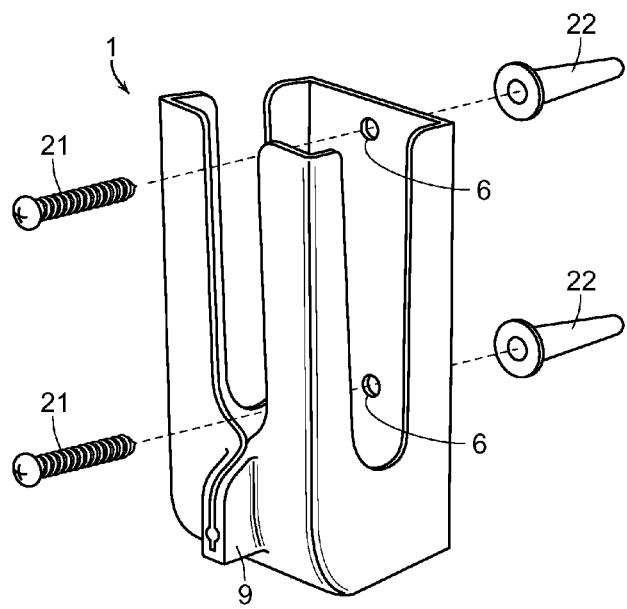
FIG. 7 is a right side perspective of the device during use, namely the device is being screwed to the wall.

The rear sidewall of the device has means for attaching to a vertical supporting surface such as a cabinet, a closet door, or any other convenient surface in the home, yard, office, play area, kennel, pool shed, recreation space, back door area, and the like. In the embodiment shown in FIGS. 1-7, the attachment means are holes [6] that can accept screws and stabilizers [21 and 22] as shown in FIG. 7. The holes [6] can also accept other instruments such as nails, which could affix the device to the wall or other surface. In another embodiment shown in FIG. 8, the means are adhesive panels [6a] that can be affixed to the wall. The adhesive could be two-sided tape or other form of adhesive having a peeling protective layer.

Figure 6:
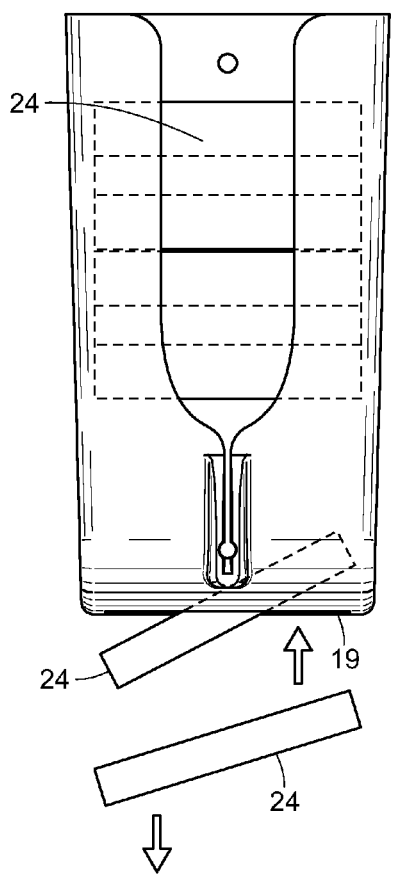
FIG. 6 is a front view of the device during use, namely a plurality of rolls of bags are being placed in the device and also extracted from the bottom of the device.

With reference to FIGS. 5-6, the rectangular receptacle is dimensioned to receive at least one waste bag roll [24] and generally to receive a plurality of waste bag rolls in a stacked configuration. The preferred embodiment is dimensioned to hold several standardized pet waste bag rolls, and is therefore a vertical rectangle with length approximately 5 inches, width approximately 3 inches, and depth approximately 1⅞ inches at the top of the receptacle, with the depth at the base of the receptacle being slightly more narrow than the depth at the top. This difference in depth has aesthetic purpose as well as increasing the depth at the base of the guide wedge, which extends at least ⅛ inch from the base of the receptacle. Of course, these dimensions are exemplary and not intended to limit the scope of the invention. The dimensions of the guide wedge can differ based on the size of the bag rolls and the thickness of the bags. For instance, a shorter and/or shallower wedge may accommodate larger bags, while thicker bags may require a wider chute and aperture.

In some embodiments of this invention, the front sidewall and bottom sidewall [7] connect to form a curvature [15] so that the cradled cylindrical waste bag roll [24] will rotate easily inside the device. By permitting the waste bag roll to rotate easily at the base of the receptacle, the curvature [15] further reduces tension from the bag that is trapped in the chute [25], further facilitating the bags to rest in the receptacle without popping up and away from the wedge [9].

In some embodiments, the bottom sidewall [7] of the receptacle preferably comprises an exit opening [19] from which empty rolls can be removed, as shown in FIG. 6. Because the bottom-most roll in the receptacle will always become smaller as the bags are removed in succession to be used until only the spool of the roll remains, the exit opening [19] would have a width at least 1 mm less than the width of the spool of the roll. Thus when the roll is empty, the user only need push the spool up slightly in the receptacle through the exit opening in order to angle the spool and extract it through the exit opening. In some embodiments the two opposing sidewalls [3 and 4] may also comprise side openings [16 and 17] to facilitate removal, visualization, or rearrangement of bags.

The bag dispenser may be made of material that can be repeatedly bent without fracturing, such as polyethylene, polypropylene, vinyl, nylon, rubber, various impregnated or laminated fibrous materials, various plasticized materials and the like, and in some instances aluminum or stainless steel.

Figure 8:
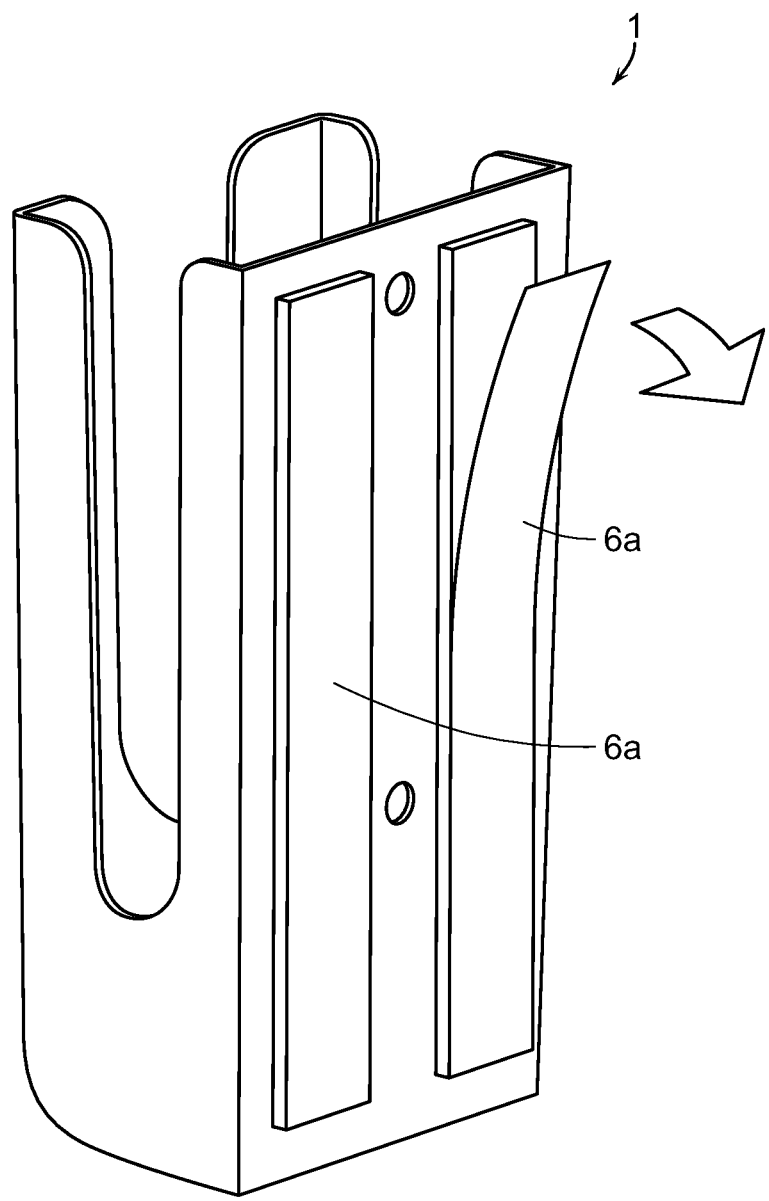
FIG. 8 is a right back perspective of the device.

A method of using the present invention may include the following: A user attaches the device to a wall or other supporting surface using screws or adhesive, as shown in FIGS. 7-8. Then, as shown in FIG. 5A the user may load at least one waste bag roll [24] into the receptacle [1], so that a waste bag roll [24] is cradled at the base of the chute. For the first roll loaded into the device the user can also guide the first bag through the dispensing slot [25] so that it is ready to be dispensed. As seen in FIG. 5B, the first bag can then be torn from the dispensing slot [25] whenever the user is ready to use the bag. The guide wedge [9] will retain the subsequent bag in place, partially emerged from the dispensing slot [25], ready for the next use. When the roll is empty, it can be removed through the exit aperture [19], as shown in FIG. 6.

The invention claimed is:

1. A device for dispensing plastic bags from a cylindrical roll, comprising:
   a. a rectangular receptacle having a front sidewall; left and right opposing sidewalls defining a width of the receptacle, the width of the receptacle sufficient for accepting the cylindrical roll; a rear sidewall with attachment means making the apparatus wall-attachable; a bottom sidewall; and no top sidewall such that the cylindrical roll can be deposited horizontally into the top of the receptacle; and
   b. a dispenser protruding from the base of the front sidewall, the dispenser comprising a wedge having a curved slope forming the front of the dispenser and a tip connecting to the front sidewall, the wedge further comprising a vertical chute in open communication with the interior of the receptacle and extending from the tip of the wedge to the base of the wedge, and c. wherein the front sidewall of the receptacle has an opening that narrows to become continuous with the vertical chute at the tip of the wedge.

2. The apparatus of claim 1 wherein the vertical chute further comprises a cylindrical dispensing aperture with circumference wider than the width of the vertical chute.

3. The apparatus of claim 2 wherein the front sidewall and the bottom sidewall connect to form a curved front base sidewall to fit the curvature of the cylindrical roll.

4. The apparatus of claim 2 wherein the bottom sidewall comprises an exit opening having a width less than the length of an inner spool of the cylindrical roll.

5. The apparatus of claim 3 wherein the bottom sidewall comprises an exit opening having a width less than the length of an inner spool of the cylindrical roll.

6. The apparatus of claim 2 wherein the left and right opposing sidewalls each comprise a side opening for providing access to the cylindrical roll.

7. The apparatus of claim 3 wherein the left and right opposing sidewalls each comprise a side opening for providing access to the cylindrical roll.

8. The apparatus of claim 4 wherein the left and right opposing sidewalls each comprise a side opening for providing access to the cylindrical roll.

9. The apparatus of claim 5 wherein the left and right opposing sidewalls each comprise a side opening for providing access to the cylindrical roll.

10. The apparatus of claim 6 wherein the attachment means comprises one or more apertures for accepting screws and/or nails.

11. The apparatus of claim 7 wherein the attachment means comprises one or more apertures for accepting screws and/or nails.

12. The apparatus of claim 8 wherein the attachment means comprises one or more apertures for accepting screws and/or nails.

13. The apparatus of claim 9 wherein the attachment means comprises one or more apertures for accepting screws and/or nails.

14. The apparatus of claim 6 wherein the attachment means comprises one or more adhesive pads.

15. The apparatus of claim 7 wherein the attachment means comprises one or more adhesive pads.

16. The apparatus of claim 8 wherein the attachment means comprises one or more adhesive pads.

17. The apparatus of claim 9 wherein the attachment means comprises one or more adhesive pads.

* * * * *